United States Patent
Yasuda et al.

(10) Patent No.: US 6,264,092 B1
(45) Date of Patent: Jul. 24, 2001

(54) METHOD FOR SEALING VACUUM STRUCTURE

(75) Inventors: Shinya Yasuda; Toyohiko Takatsuki; Mamoru Fujiyama; Hiroshi Haita, all of Osaka (JP)

(73) Assignee: Zojirushi Corporation, Osaka-fu (JP)

( * ) Notice: Subject to any disclaimer, the term of this patent is extended or adjusted under 35 U.S.C. 154(b) by 0 days.

(21) Appl. No.: 09/369,864

(22) Filed: Aug. 9, 1999

(30) Foreign Application Priority Data

Aug. 10, 1998 (JP) .................................................. 10-225872

(51) Int. Cl.⁷ ............................ B23K 31/02; E04B 1/682
(52) U.S. Cl. ......................... 228/161; 228/165; 228/174; 228/256; 277/316
(58) Field of Search ..................................... 228/125, 155, 228/159, 161, 163, 164, 165, 174, 256; 277/316

(56) References Cited

U.S. PATENT DOCUMENTS

| | | |
|---|---|---|
| 4,157,779 | 6/1979 | Ishii et al. . |
| 4,197,957 * | 4/1980 | Buhrer . |
| 5,153,977 * | 10/1992 | Toida et al. . |
| 5,500,305 * | 3/1996 | Bridges et al. . |
| 5,695,844 * | 12/1997 | Neeser et al. . |
| 5,791,551 * | 8/1998 | Parks et al. . |

FOREIGN PATENT DOCUMENTS

| | | |
|---|---|---|
| 2286111 | 11/1990 | (JP) . |
| 719402 | 5/1995 | (JP) . |
| 7298991 | 11/1995 | (JP) . |
| 2502403 | 4/1996 | (JP) . |
| 410043066A * | 2/1998 | (JP) . |
| 11047004A * | 2/1999 | (JP) . |

* cited by examiner

*Primary Examiner*—Tom Dunn
*Assistant Examiner*—Kiley Stoner
(74) *Attorney, Agent, or Firm*—Birch, Stewart, Kolasch & Birch, LLP

(57) ABSTRACT

The present invention is a method of sealing a metal vacuum structure (vacuum bottle) for evacuating a space S closed by component members (an inner shell 2 and an outer shell 3) through an evacuation port and then sealing the evacuation port. Forming a brazing-material placing recess 6 in one of the component members, the brazing-material placing recess opening downward when the structure is set for evacuation; forming an aperture 7 in the brazing-material placing recess; placing brazing material, in molten state, in the brazing-material placing recess in such a way as to block the aperture and fixing the brazing material; forming an evacuation port 8a in the brazing material; fixing a drop preventing member 9 having a through hole 11 on the component member in opposed relation to the brazing material; evacuating the space closed by the component members through the evacuation port of the brazing material; melting the brazing material; and making the evacuation port disappear to seal it by melting the brazing material as the drop preventing member prevents the brazing material from dropping.

8 Claims, 10 Drawing Sheets

METHOD FOR SEALING VACUUM STRUCTURE

FIELD OF THE INVENTION

The present invention relates to a sealing construction of vacuum structures, such as vacuum bottle, vacuum double pipe, insulated vacuum panel, and vacuum vessel.

BACKGROUND OF THE INVENTION

In the past, various methods have been proposed for sealing a vacuum structure, for example, a vacuum bottle comprising metal-made inner and outer shells as described in Japanese Patent Publication No. 61-1136, Japanese Patent Laid-open Publication No. 2-286111, Japanese Utility Model Registration No. 2502403, Japanese Utility Model Publication No. 7-19402, and Japanese Patent Laid-open Publication No. 7-298991.

(1) In the method of Japanese Patent Publication No. 61-1136, an evacuation port is formed on a bottom plate of an outer shell. A brazing material is disposed on the periphery of the evacuation port in a space between the inner and outer shells and a sealing plate is disposed on the brazing material. After aforementioned space is evacuated, the brazing material is melted by heating, so that the periphery of the evacuation port and the sealing plate are joined together for sealing the evacuation port.

(2) In the method of Japanese Patent Laid-open Publication No. 2-286111, an evacuation port is formed on the outer shell and a brazing material is placed on the periphery of the evacuation port so that the evacuation port can be sealed by the brazing material only and without using a sealing plate. In this publication, there is also disclosed a method such that an upwardly open semi-spherical recess is provided on the outer surface side of the outer shell, with the evacuation port formed centrally of the bottom of the recess so that molten brazing material can be guided into the evacuation port.

(3) In the method of Japanese Utility Model Registration No. 2502403, an upwardly open recess is provided on the outer surface of the outer shell, with an evacuation port provided in the recess, and a brazing material is placed on the periphery of the evacuation port so that the evacuation port can be sealed with the brazing material alone in the same way as in the publication (2) above, without using a sealing plate. Specifically, in the publication the recess is semi-spherical or the bottom of the recess defines an inclined surface with the evacuation port formed at the lowermost end thereof for guiding the molten brazing material to the evacuation port.

(4) In the method of Utility Model Publication No. 7-19402, an evacuation port is provided on the outer shell or inner shell, with a cylindrical wall formed along the inner periphery of the evacuation port which projects on a spatial side, and a brazing material is disposed on the outer periphery of the evacuation port on the opposite side to the cylindrical wall so that the molten brazing material is caused to enter into the cylindrical wall thereby to seal the evacuation port.

(5) In the method of Japanese Patent Laid-open Publication No. 7-298991, first, a component member, that is, outer shell or inner shell, is brazed with a brazing material. Then the brazing material and the component member are formed with a through hole having a diameter of about 1 mm to 3 mm. After a space between the outer shell and the inner shell is evacuated via the through hole, the brazing material is melted by a laser beam for sealing the through hole.

However, with the sealing method described in the publication (1) above, disadvantage is that no provision is made for positioning and holding the brazing material and the sealing plate, so that there is a possibility that the brazing material may be moved from its original position by a time when the evacuation port is sealed by the heated and molten brazing material and the sealing plate, with the result that the brazing material may go out of position and fall in the process of sealing. This poses a problem that the stability of the seal is rather low. Since the brazing material and sealing plate are disposed on the spacious side before evacuation, the condition of their arrangement prior to the evacuation cannot be recognized. Further, since the periphery of the evacuation port and the sealing plate must be joined with brazing material, the areas to be joined together are rather extended and possibly this may lead to unsatisfactory sealing.

In the methods described in the publications (2), (3) and (4) above, as in the case of the publication (1), no provision is made for positioning and holding the brazing material, so that there is a possibility that the brazing material may be moved from its original position by the time of sealing of the evacuation port, with the result that the brazing material may go out of position and fall. Further, since the brazing material is guided to the evacuation port through a curved portion of the recess, the possibility of occurrence of unsatisfactory seal will increase unless the direction of positioning the brazing material is assuredly determined. This poses a limitation such that high precision is required with respect to the design of the production line.

In the method described in the publication (5) above, the component member is brazed with the brazing material and thereafter the brazing material and the component member are bored therethrough to define the evacuation port. Therefore, it is possible to eliminate the possibility of brazing material dropping before the evacuation port is sealed as in the case of methods described in the publications (1) through (4) In such a method, however, since brazing with the brazing material is carried out before the evacuation port is formed, it is difficult to eliminate the gas contained in the brazing material and this easily leads to the occurrence of voids on the fused surface of the brazing material and the component members. Therefore, when a through hole (evacuation port hole) is formed in such a condition and if, after evacuation, the through hole is sealed by fusion, voids cannot completely be eliminated, which leaves the possibility of occurrence of unsatisfactory sealing. Further, in case that a void should occur, the void cannot be visually determined, and this prevents adoption of any correcting measure prior to the stage of sealing, which in turn affect productivity.

SUMMARY OF THE INVENTION

Therefore, the primary object of the present invention is to provide a sealing method for firmly affixing a brazing material to seal the space closed by component members and for surely releasing gas evolving on a brazing material deposit surface during the deposition of the brazing material.

In order to accomplish the above object, according to the present invention there is provided a method of sealing a metal vacuum structure for evacuating a space closed by component members through an evacuation port and then sealing the evacuation port, the method comprising:

forming a brazing-material placing recess in one of the component members, the brazing-material placing recess opening downward when the structure is set for evacuation;

forming an aperture in the brazing-material placing recess;

placing brazing material, in molten state, in the brazing-material placing recess in such a way as to block the aperture and fixing the brazing material;

forming an evacuation port in the brazing material;

fixing a drop preventing member having a through hole on the component member in opposed relation to the brazing material;

evacuating the space closed by the component members through the evacuation port of the brazing material;

melting the brazing material; and making the evacuation port disappeared to seal it by melting the brazing material as the drop preventing member prevents the brazing material from dropping.

According to the aforementioned method for sealing the vacuum metal structure, the brazing material is placed, in molten state, in the brazing-material placing recess formed with the aperture and the brazing material is formed with a evacuation port. Therefore, the brazing material is assuredly prevented from dropping off the brazing-material placing recess during the step of evacuating. In this case, any gas evolving from brazing material or the like goes away from the aperture, thereby any trouble such as voids will not occur and this permits accurate deposition. When the evacuation port formed in the brazing material is sealed, the brazing material is melted again so that dropping of the molten brazing material can be prevented by the drop preventing member, thereby causing the evacuation port to disappear by deposition of the brazing material itself. In this way, the evacuation port formed in the brazing material can be assuredly sealed.

In the above described sealing method, preferably, the diameter of the aperture is not less than 3 mm.

Preferably, the brazing material is placed, in molten state, in the brazing-material placing recess in which flux is carted.

Preferably, the drop preventing member is formed with a recess open upward and opposed to the evacuation port, whereby molten brazing material in the brazing-material placing recess concentrates in the recess so that the evacuation port can be assuredly made to disappear and sealed.

Preferably, the through hole of the drop preventing member is opposed to the evacuation port and has a diameter of not more than 2 mm, so that molten brazing material is prevented from dropping through the through hole of the drop preventing member.

The drop preventing member may be comprised of a mesh-like wire sheet. This makes it possible to improve working efficiency for evacuating the space and to assuredly prevent the molten brazing material from dropping.

Preferably, the evacuation port in the brazing material is smaller in diameter than the aperture but not less than 3 mm, and wherein the evacuation port of the brazing material can be made to disappear by application of an external force during the step of melting the brazing material, so that any gas evolving during the process of melting the brazing material can be discharged.

Preferably, the drop preventing member is fixed to the component members by spot welding, which only requires a simple arrangement.

DETAILED DESCRIPTION OF THE PREFERRED EMBODIMENTS

Preferred embodiments of the invention will now be described with reference to the accompanying drawings.

Figure 1:
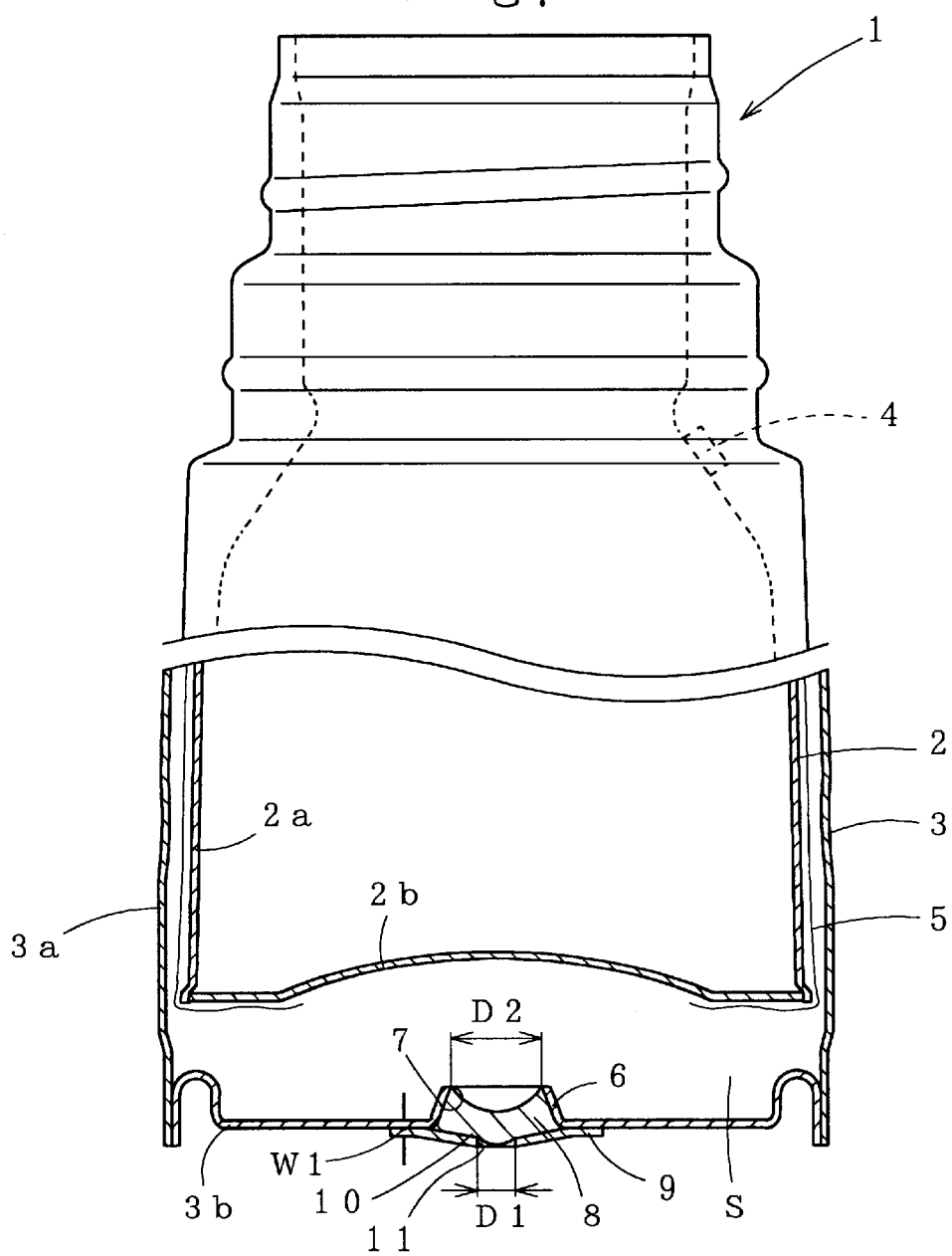
FIG. 1 is a sectional view showing a first vacuum bottle as a vacuum sealing structure fabricated by a sealing method according to a first embodiment of the present invention.

FIG. 1 shows a first vacuum bottle 1, that is, a vacuum structure fabricated by a sealing method according to a first embodiment of the invention. The vacuum bottle 1 is a double shell container comprising an inner shell 2 and an outer shell 3, both made of metal, such as stainless steel (SUS304). The inner shell 2 and the outer shell 3 are respectively comprised of body 2a, 3a and bottom plate 2b, 3b, which are joined by welding or the like at mouth portions of respective bodies 2a, 3a, with space S formed between them.

The body 2a of the inner shell 2 is fitted in its upper portion with a getter 4 for adsorbing gases evolving within the space S. A metal foil 5 comprised of copper or aluminum for preventing radiation convection is wound on the outer periphery of the body 2a.

The bottom plate 3b of the outer shell 3 is formed centrally with a brazing-material placing recess 6 which is open downward. The brazing-material placing recess 6 has a cone-shaped cylinder configuration and is formed at its upper end with an aperture 7 which communicates with space S. A metal-made brazing material 8 is melted and fixed in the space S formed by the brazing-material placing recess 6 and a drop preventing member 9 to be described hereinafter. That is, in the present embodiment, by virtue of the drop preventing member 9 the molten brazing material 8 is prevented from dropping, and by virtue of the brazing material 8 melted and fixed in the brazing-material placing recess 6 the space S is hermetically sealed from outside.

Figure 2:
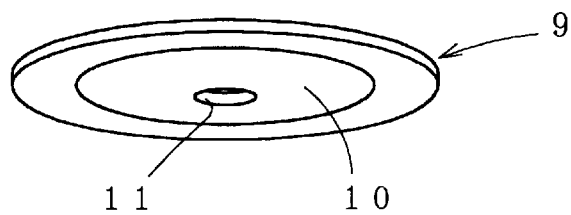
FIG. 2 is a perspective view showing a drop preventing member.

On the bottom plate 3b, at the outer side of the brazing-material placing recess 6, there is disposed the aforementioned drop preventing member 9 comprised of stainless steel or the like which has poor wettability in relation to the brazing material 8. As shown in FIGS. 1 and 2, the drop preventing material 9 is formed with a recess 10 open upward, and the recess 10 is formed with a through hole 11 having a diameter D1 of not more than 2 mm in opposed relation to the aperture 7 of the bottom plate 3b. The opening size of the recess 10 is about equal in diameter to the opening size of the brazing-material placing recess 6 of the bottom plate 3b.

Next, description will be made with respect to the fabrication of the vacuum bottle 1.

Figure 3A:
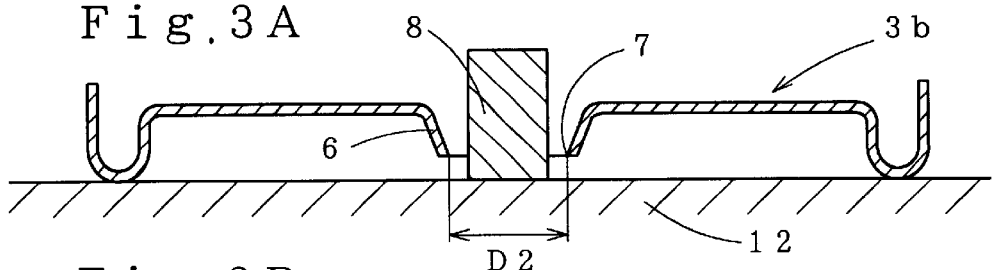
FIGS. 3A, 3B, 3C, 3D, and 3E are a series of flow sheets showing a mounting process for mounting a brazing material and a drop preventing member to a bottom plate.

First, as FIG. 3(A) shows, with the bottom plate 3b of the outer shell 3 held in an inverse condition so that the brazing-material placing recess 6 is positioned to face upward, the interior of the brazing-material placing recess 6 is coated with flux. Thereafter, the bottom plate 3b is placed on a brazing Jig 12 for blocking the aperture 7 of the brazing material placing recess 6 with a slight clearance (about 1 mm) from the brazing jig 12, and then the block-like solid brazing material 8 is placed from above. Instead of flux coating, the bottom plate 3b may be plated by a metal which provides good wettability, and alternatively may be made of a metal of good wettablity. Also, as the brazing material 8 itself, other brazing material having good wettability may be used. However, in order to improve productivity, it is desirable that the brazing material 8 per se is a general-purpose metallic material, and from the view point of environmental sanitation in particular it is desirable to use a zinc-tin type material or tin-silver type material having no lead content.

Figure 3B:
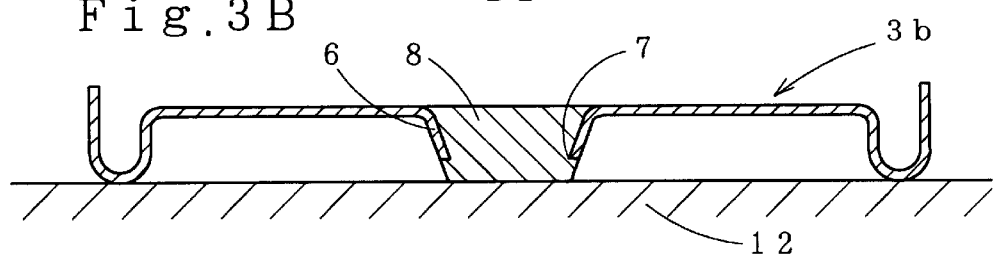

Consequently, as FIG. 3(B) shows, the brazing material 8 is melted by heating. In this conjunction, it is noted that the aperture 7 has a diameter D2 of not less than 3 mm and, therefore the brazing material 8 is in a ready-to-flow condition. Thereby, the molten brazing material 8 begins to flow into the clearance between the aperture 7 and the brazing jig 12, and various gases flow outward. Therefore, there is no possibility of voids or the like evolving on a deposition surface defined by the brazing material 8 and the brazing-material placing recess 6.

When the molten brazing material 8 is solidified, the brazing-material placing recess 6 is already brazed in a condition filled with the brazing material 8. In this condition, there is no possibility of dropping of the brazing material 8, because the brazing material 8 is firmly deposited on the bottom plate 3b. The size of the brazing-material placing recess 6 is preferably such that in FIG. 3(A) the diameter D2 of the aperture 7 is not less than 3 mm so as to facilitate the flow of molten brazing material 8. In the present embodiment, the diameter of the aperture 7 is 6 mm, the diameter of the opening of the brazing-material placing recess 6 is about 8 mm, and the height of these portions is about 2.5 mm, whereby a conical cylinder shape is formed. Therefore, the quantity of the brazing material 8 used for this purpose is very small, say, about 1.2 g.

Figure 3C:
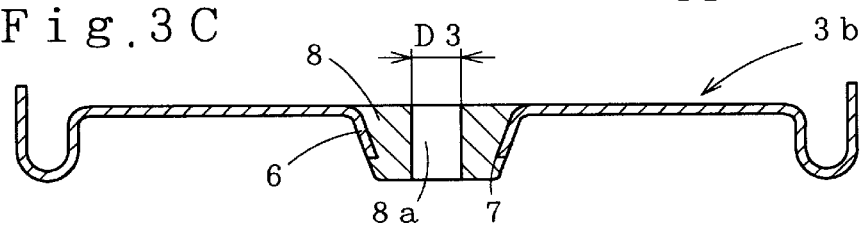

Then, as FIG. 3(C) shows, the brazing jig 12 is removed and an evacuation port 8a extending through the brazing material 8 is formed by using a drill or the like. In the present embodiment, the diameter D3 of the evacuation port 8a is same as diameter D1 of the through hole 11 of the drop preventing member 9, say, about 2 mm.

Figure 3D:
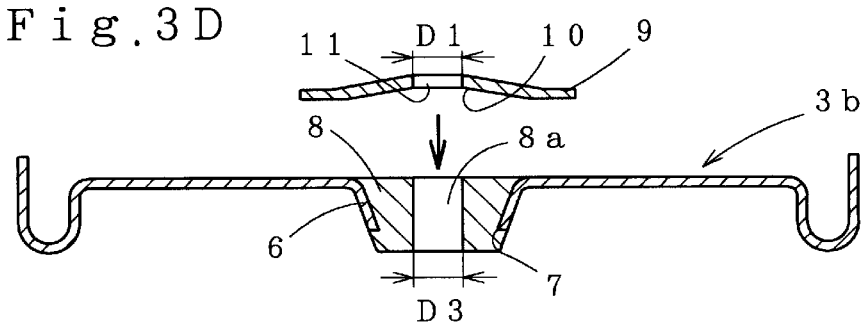
Figure 3E:
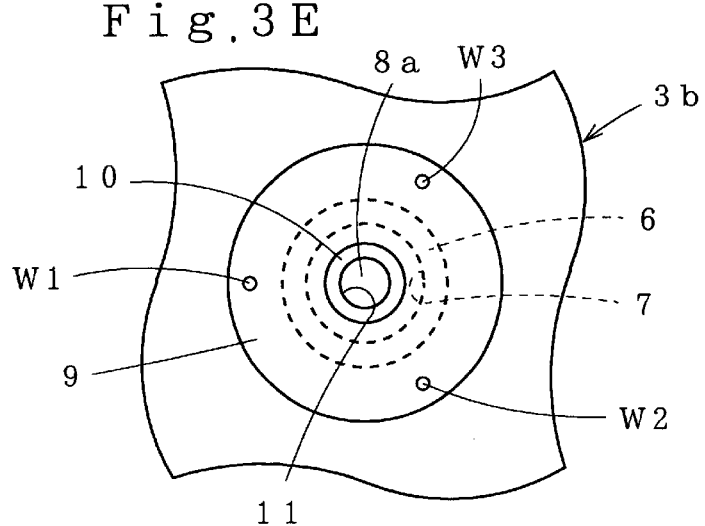

Next, as FIG. 3(D) shows, the drop preventing member 9 is disposed on an upper portion of the brazing-material placing recess 6 located at outer side in assembled condition, and is spot welded at a predetermined spacing (3 spots W1, W2, W3 in the present embodiment) as shown in FIG. 3(E) to join the drop preventing member 9 with the bottom plate 3b of the outer shell 3. Jointing by spot welding in this way has an advantage that the bottom plate 3b is less subject to unfavorable effect of jointing and to occurrence of pin holes and the like. The joint strength of the drop preventing member 9 may be of such order that the drop preventing member 9 will not become disengaged due to the heat of a molten brazing material 8' or by gravitational effect when the evacuation port 8a provided on the brazing material 8 is closed. Therefore, any hard joining welding means is not required and complete sealing between the drop preventing member 9 and the bottom plate 3b is not required either.

Figure 4:
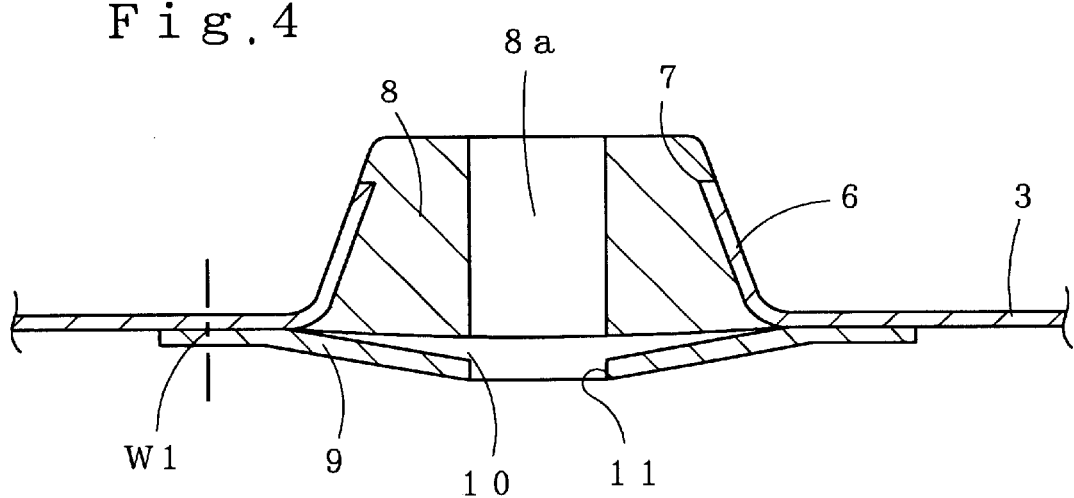
FIG. 4 is a fragmentary sectional view showing a brazing material and a drop preventing member as mounted in position.

In this conjunction, it is noted that as FIG. 4 shows, the diameter of the opening of the recess 10 of drop preventing member 9 is almost equal to the diameter of the opening of the brazing-material placing recess 6 of the bottom plate 3b. Therefore, a slight projection of the end of the brazing material 8 will not affect the spot welding in any way. The evacuation port 8a formed in the brazing material 8 coincides with the through hole 11 formed in the drop preventing member 9.

Figure 5A:
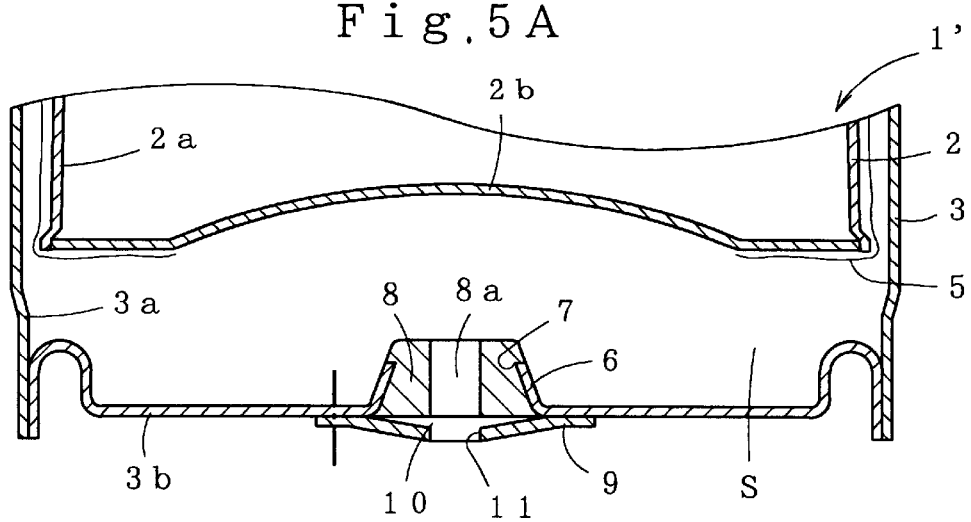
FIGS. 5A, 5B, and 5C are sectional views showing the process of sealing a double shell vessel.

Subsequently, the bottom plate 3b on which the brazing material 8 and the drop preventing member 9 are fixed is arranged at a lower end opening of the body 3a of the outer shell 3 in which the inner shell 2 is fixed, and outer peripheral edges of the body 3b and the bottom plates 3b are jointed together to form a double-shell container 1' with various component members assembled together therewith as shown in FIG. 5(A).

Next, the double-shell container 1' is placed uprightly in a well known heating furnace or the like. Oils, water and the like deposited on the surface of the double shell container 1', and gases adsorbed in the component metal of the inner shell 2 and the outer shell 3 are released as the surfaces of the inner shell 2 and the outer shell 3 are heated at a predetermined temperature which will not melt the brazing material 8, as well as the space S between the inner shell 2 and the outer shell 3 is evacuated through the evacuation port 8a of the brazing material 8 by using a well-known vacuum evacuation furnace or the like. Aforementioned oils, water, and adsorbed gas may be previously removed by preheating the double-shell container 1' before it is placed in the evacuation unit, or before it is assembled as such.

Subsequently, when the space S of the double-shell container 1' reaches a predetermined degree of vacuum through an evacuation operation, the temperature in the heating furnace is raised to a temperature at which the brazing material 8 can be melted, and a sealing operation is carried out. In this connection, the sealing operation is carried out according to a known heating method. However, in the case that a high frequency current of 20 to 50 kHz is passed to a coil and that component members located around the brazing material 8 are induction-heated by the coil, it is desirable that the drop preventing member 9 is comprised of SUS430 or SUS304 1/2H material which exhibits good heating efficiency. If the drop preventing member 9 is comprised of SUS304 1/2H material, and the bottom plate 3b is also comprised of SUS304, then good working efficiency can be obtained with respect to above described spot welding.

Figure 5B:
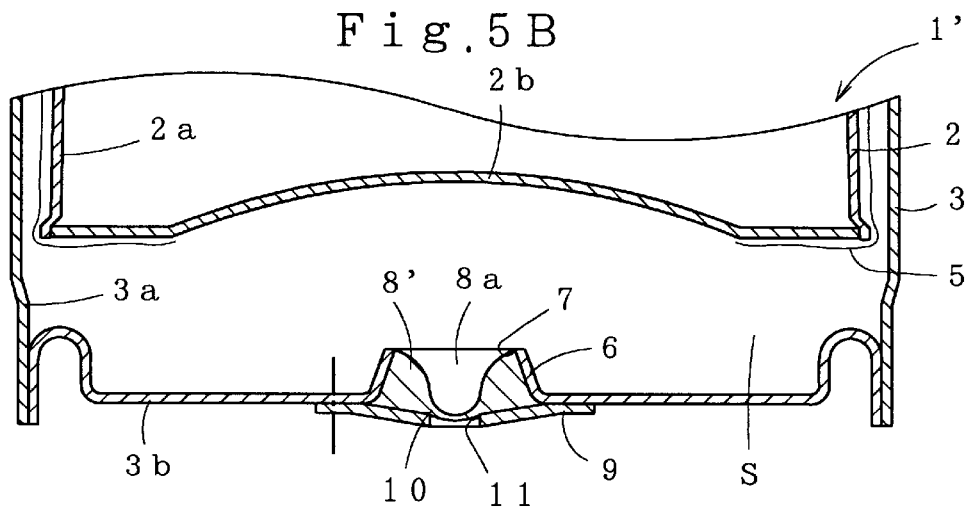

As the temperature of the brazing material 8 is raised to a melting point so that the brazing material 8 is melted as FIG. 5 (B) shows, molten brazing material 8' flows downward in such a manner as will gravitationally flow outward from the brazing-material placing recess 6. At this point of time, the drop preventing member 9 is positioned under the brazing material placing recess 6. Further, the diameter D1 of a through hole 11 formed in the drop preventing member 9 is not more than 2 mm, and the drop preventing member 9 is comprised of a material having poor wettability. Therefore, the molten brazing material 8' will not drop outward passing through the through hole 11. Further, in the present embodiment, the drop preventing member 9 is formed with the recess 10 and, therefore, the molten brazing material 8' becomes centrally concentrated without spreading outward.

Figure 5C:
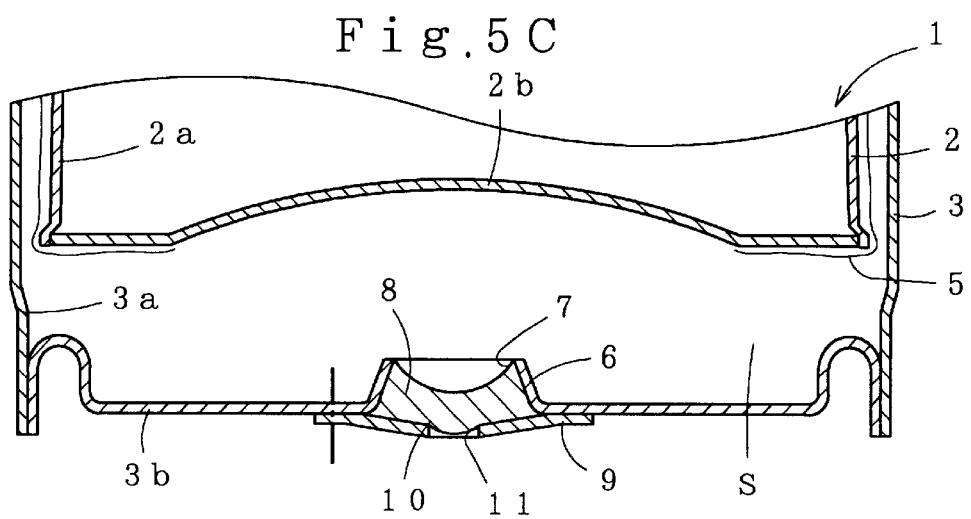

Thereafter, as FIG. 5(C) shows, upper surface of the molten brazing material 8' is smoothly recessed by the action of surface tension to cause the evacuation port 8a to disappear per se. Sealing operation is thus completed. The condition of deposition of the molten brazing material 8' onto the brazing-material placing recess 6 is maintained at a level comparable to that prior to the sealing process.

In this way, according to the sealing method of the first embodiment, the drop preventing member 9 prevents dropping of the brazing material 8. The brazing material 8 per se makes the evacuation port 8a disappeared. Therefore, sealing stability is enhanced without causing any unsatisfactory sealing. The drop preventing member 9 may be removed from the bottom plate 3b of the outer shell 3 after one sealing operation is finished to complete the vacuum bottle, whereby the drop preventing member 9 can be reused for forming another vacuum bottle 1. Further, even if, at the sealing stage, double-shell container 1' is in a slightly inclined condition, dropping of the molten brazing material 8' can be prevented by the drop preventing member 9 in the same way as above mentioned. Therefore, high precision will not be required at the time of production line designing.

Figure 6A:
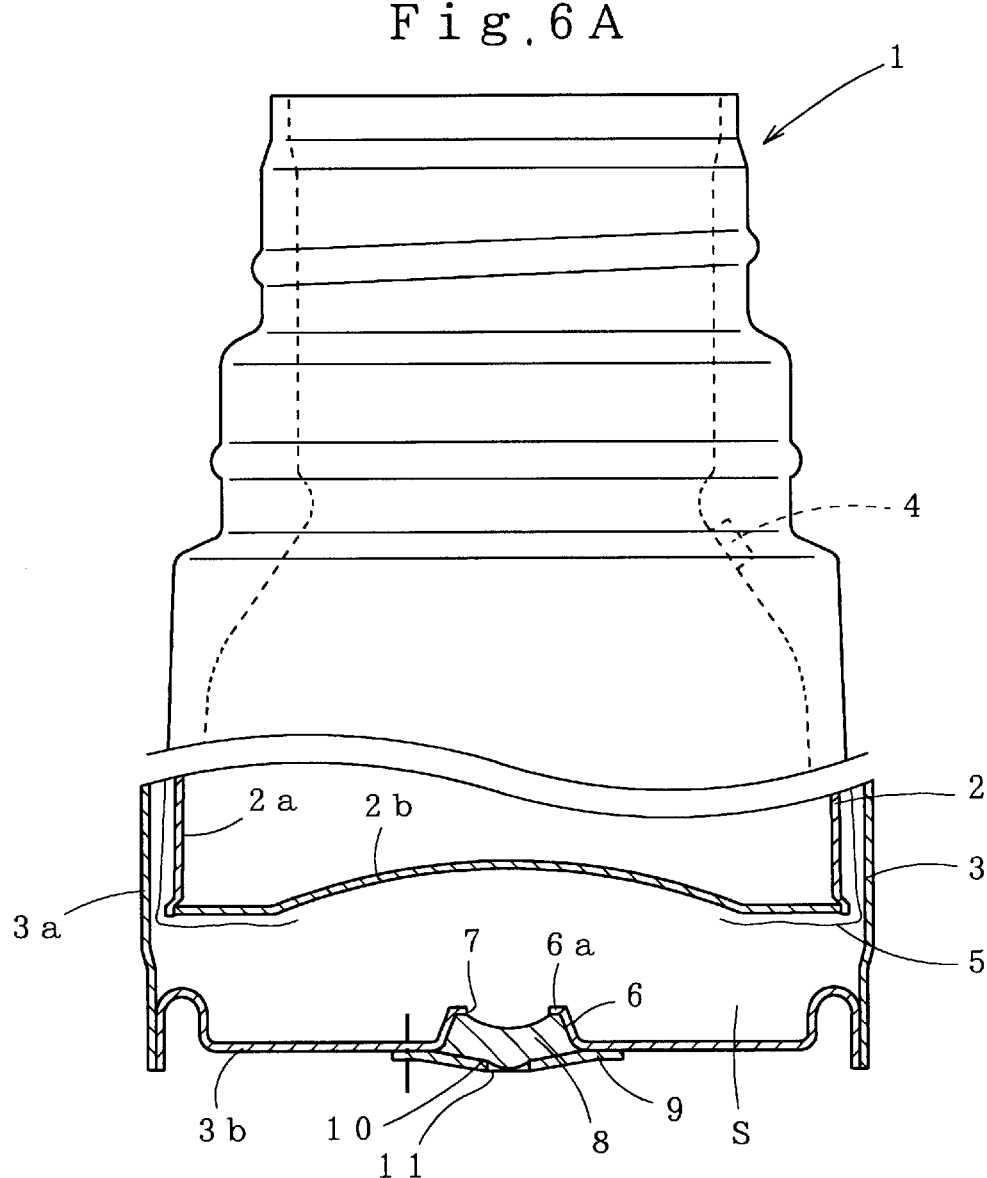
FIG. 6A shows a second vacuum bottle fabricated by a sealing method according to a second embodiment.
Figure 6B:
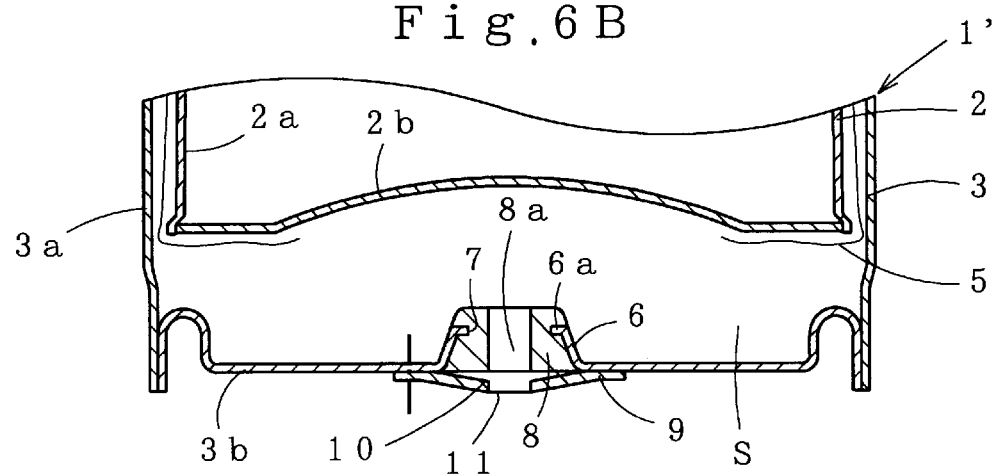
FIG. 6B is a sectional view showing a double shell vessel prior to evacuation.

FIG. 6 shows a second vacuum bottle 1 fabricated by a sealing method according to a second embodiment.

The second vacuum bottle 1 is different from the first vacuum bottle 1 only in that an inwardly projecting flange 6a is provided in the aperture 7 at the upper end of the brazing-material placing recess 6, whereas in the vacuum bottle 1 shown in FIG. 1, the brazing-material placing recess 6 is of a conical cylinder shape. With this arrangement made in such a way, at the stage for fixing the brazing material 8 by deposition (see FIG. 3B) in the brazing-material placing recess 6, the dropping speed of the brazing material 8 is slowed so that an excess of the brazing material 8 can be prevented from flowing out from such clearances.

Figure 7A:
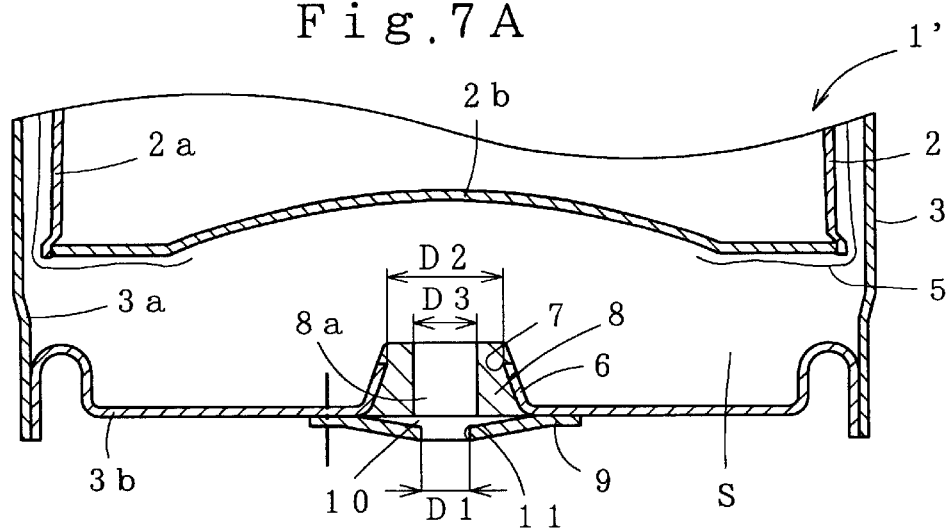
FIGS. 7A, 7B and 7C are sectional view showing a sealing method according to a third embodiment.
Figure 7B:
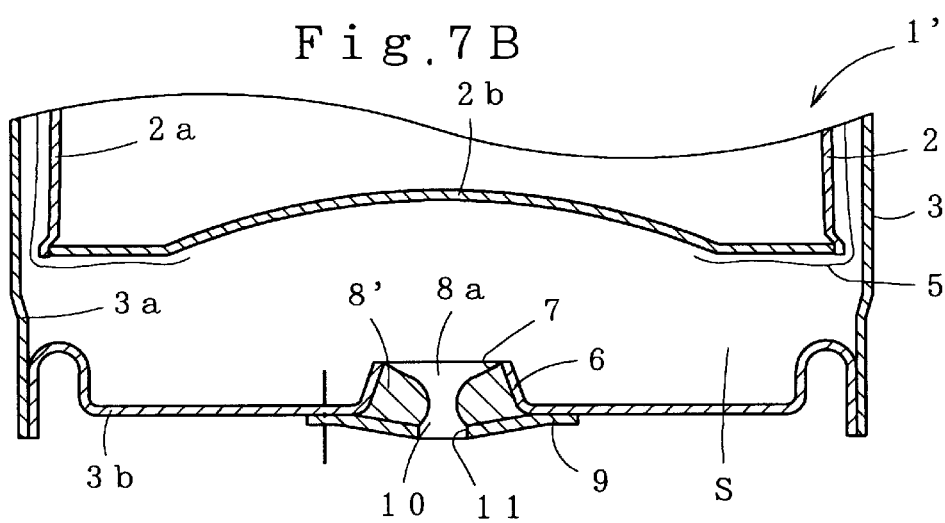

FIG. 7 shows the process of fabricating the first vacuum bottle 1 shown in FIG. 1 by a sealing method according to the third embodiment.

In the sealing method according to the third embodiment, at the stage of forming the evacuation port 8a in the brazing material 8 shown in FIG. 3(C), the diameter D3 of the evacuation port 8a is not less than 3 mm.

The double-shell container 1' assembled as shown in FIG. 7(A) is placed in the heating furnace or the like in the same way as in the case of the first embodiment, and the space S is evacuated as the surfaces of the inner shell 2 and the outer shell 3 are heated at a predetermined temperature at which the brazing material does not melt.

Next, the space S reaches a predetermined vacuum level, the temperature in the heating furnace is raised to a temperature at which the brazing material 8 can be melted. In the method of the third embodiment, as in the case of the first embodiment, when the brazing material 8 melts, the molten brazing material 8' is gravitationally lowered so that the molten brazing material 8' is prevented by drop preventing member 9 from dropping outward. However, in this third embodiment, the brazing material 8 is formed with the evacuation port 8a of not less than 3 mm in diameter, therefore, the evacuation port 8a will not be closed only by surface tension of the molten brazing material 8 itself. As a result, gases evolving upon melting of brazing material 8 can be surely discharged.

Figure 7C:
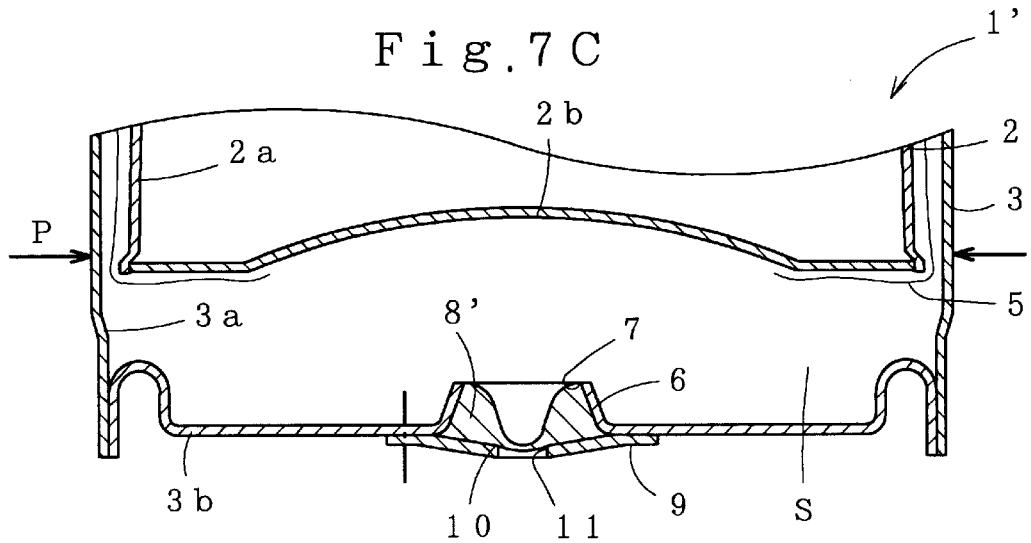

At the same time, as FIG. 7(C) shows, an external force P due to vibration is applied to the double-shell container 1' to forcibly cause the molten brazing material 8' to move, whereby the evacuation port 8a is made to disappear under the surface tension and is closed. The external force P due to vibration makes it easier to release gases evolving when the brazing material is melted. In addition, it is possible to form the evacuation port 8a to a larger diameter size.

In this way, the sealing method of the third embodiment can cope with an evacuation port 8a having a larger diameter size D3, say, not less than 3 mm, it being thus possible to enhance evacuation efficiency, resulting in working hour reduction. Further, since gases evolving in the process for melting the razing material 8 can be released, the quantity of load applied to the getter 4 for adsorbing gases released into the space S is reduced, it being thus possible to improve the evacuation efficiency of the vacuum bottle 1 itself.

It is to be noted that the method of vacuum structure sealing in the present embodiment is not limited to the above described method.

Figure 8:
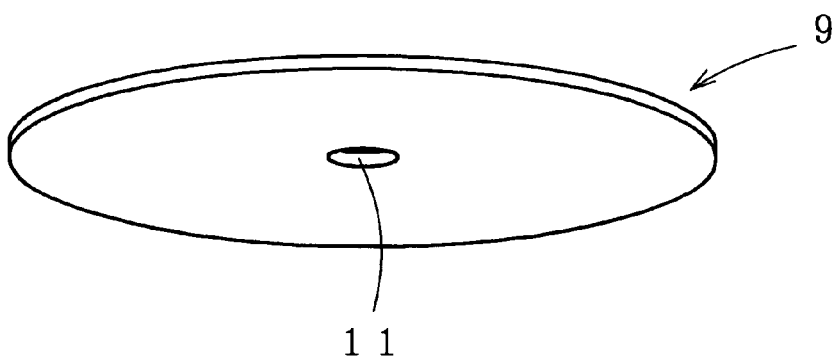
FIG. 8 is a perspective view showing a modified form of the drop preventing member.

For example, in the present embodiment, although the upwardly opening recess 10 and the through hole 11 are provided in the drop preventing member 9, the recess 10 is not necessarily required. For example, the drop preventing member 9 may be a planar-shape member formed with only a through hole 11 as shown in FIG. 8.

Figure 9:
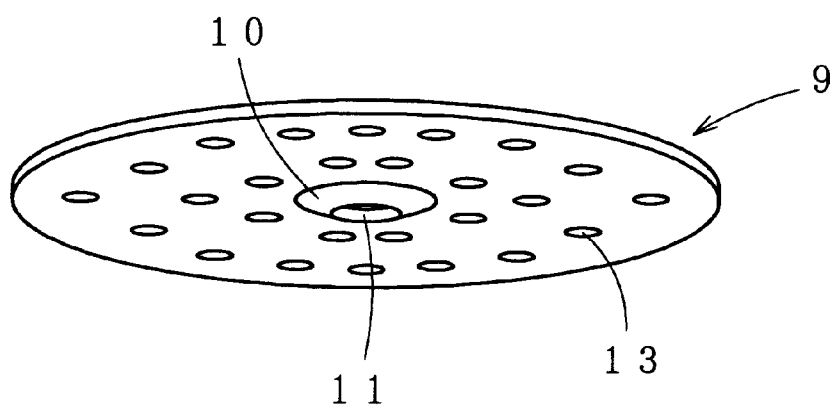
FIG. 9 is a perspective view showing another modified form of the drop preventing member.
Figure 10:
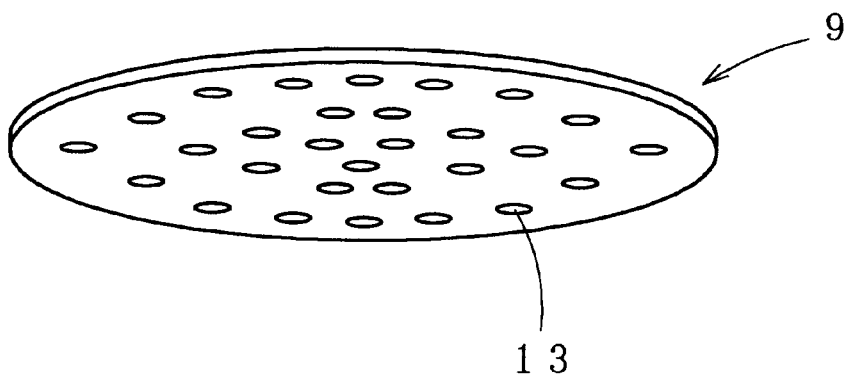
FIG. 10 is a perspective view showing another modified form of the drop preventing member.

For the drop preventing member 9, a large number of small holes 13 are formed around the recess 10 as shown in FIG. 9, or a large number of small holes 13 are formed as shown in FIG. 10. It is noted that in FIGS. 9 and 10, it is unnecessary to provide a through hole 11 or small holes 13 in opposed relation to the evacuation port 8a formed in the brazing material 8.

Figure 11:
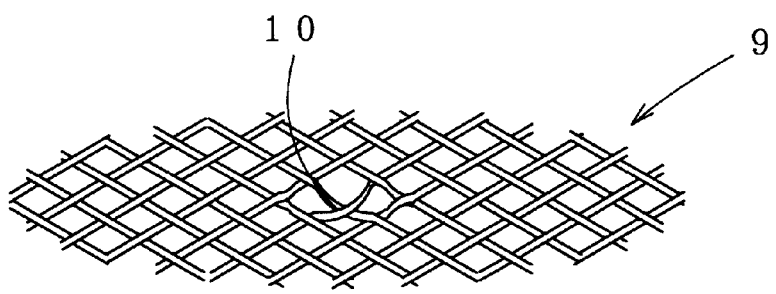
FIG. 11 is a perspective view showing another modified form of the drop preventing member.
Figure 12:
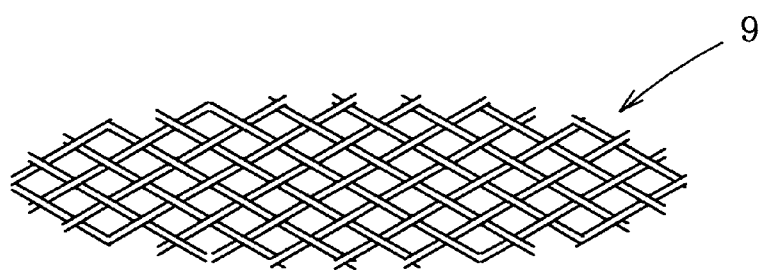
FIG. 12 is a perspective view showing another modified form of the drop preventing member.

Further, it is noted that the drop preventing material 9 is not limited to metal plates, but may be comprised of a mesh-form metal wire net having mesh openings of not more than 2 mm as shown in FIGS. 11 and 12.

Where the drop preventing member 9 shown in FIGS. 9 through 12 is applied to the first, second and third embodiments, in the same way as in the first and second embodiments, evacuation efficiency can be improved by a number of holes in the vacuum sealing process.

Figure 13:
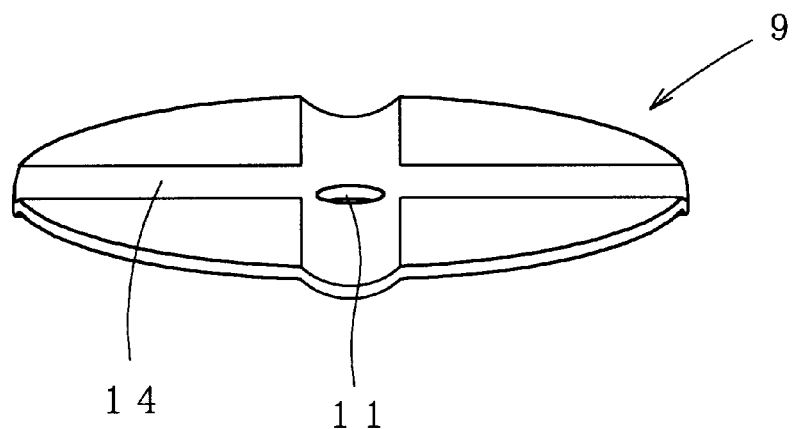
FIG. 13 is a perspective view showing another modified form of the drop preventing member.

Further, in order to improve evacuation efficiency, the drop preventing member 9 may be formed with a groove 14 as shown in FIG. 13, and through holes may be formed between the groove 14 and the bottom plate 3b of the outer shell 3.

Figure 14:
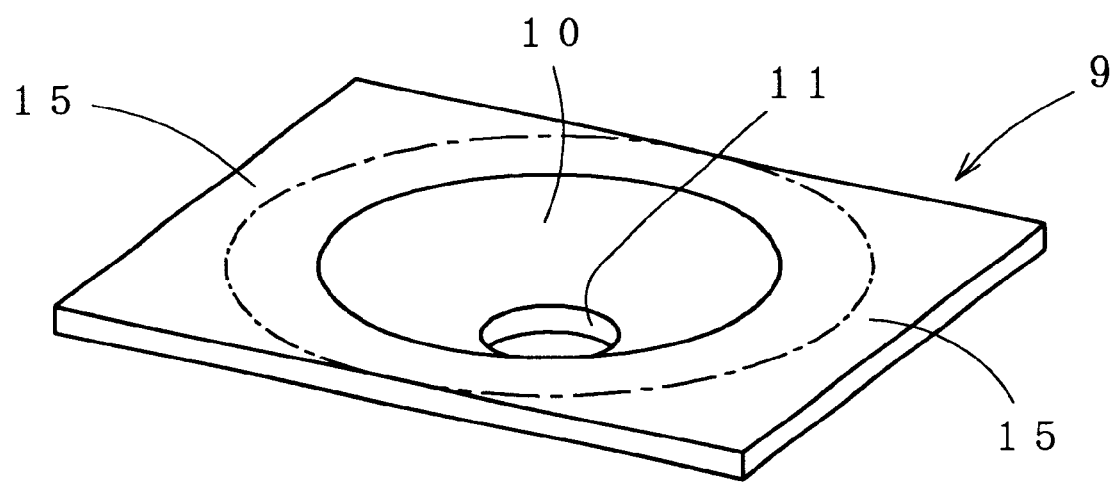
FIG. 14 is a perspective view showing another modified form of the drop preventing member.

Further, as shown in FIG. 14, projection pieces 15 which project horizontally around the circular recess 10 of the drop preventing member 9 maybe formed at one or two points (shown at two points in the drawing) to form a spot welding portion (s) having a rectangular outer configuration. Such arrangement makes it possible to reduce the size of the drop preventing member 9, resulting in material saving.

In this way, the drop preventing member 9 applied to the sealing method of the invention makes it possible to prevent the dropping of the molten brazing material 8' simply by utilization of gravitational action. Therefore, as mentioned above, for the drop preventing member various materials may be applicable, and its configuration is not limited to circular shape, and various changes, such as polygonal and other shape. Various changes are also possible in the number and shape of holes formed in the drop preventing member 9.

Figure 15:
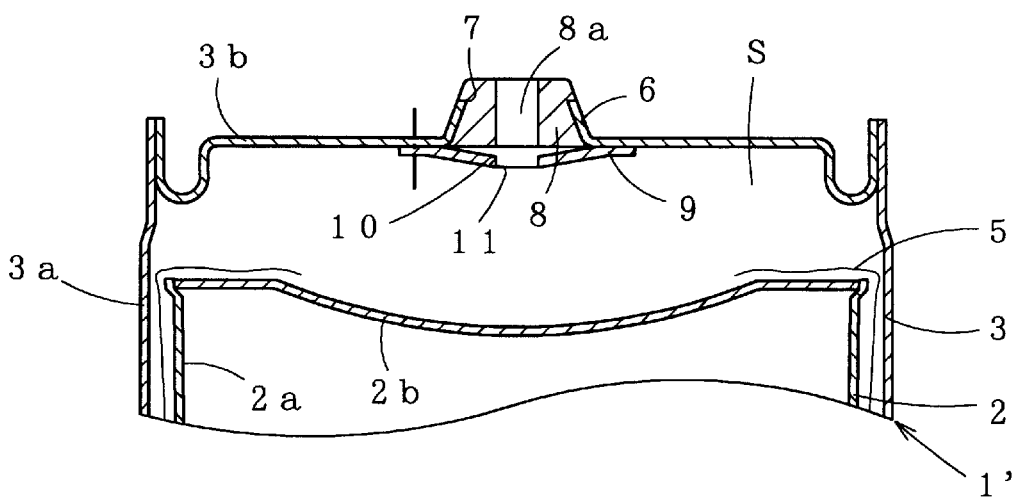
FIG. 15 is a fragmentary sectional view showing a modified form of the vacuum bottle to be fabricated according to the sealing method of the present invention.
Figure 16:
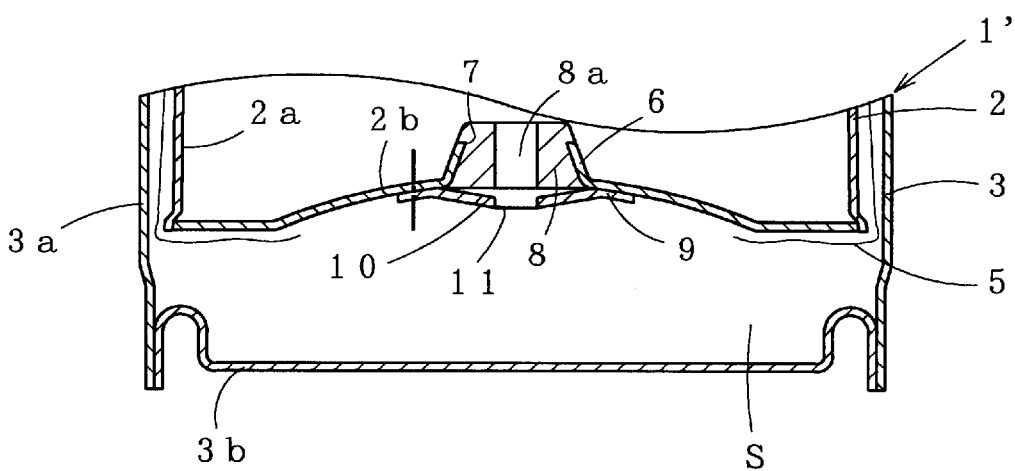
FIG. 16 is a fragmentary sectional view showing another modified form of the vacuum bottle to be fabricated according to the sealing method of the present invention.
Figure 17:
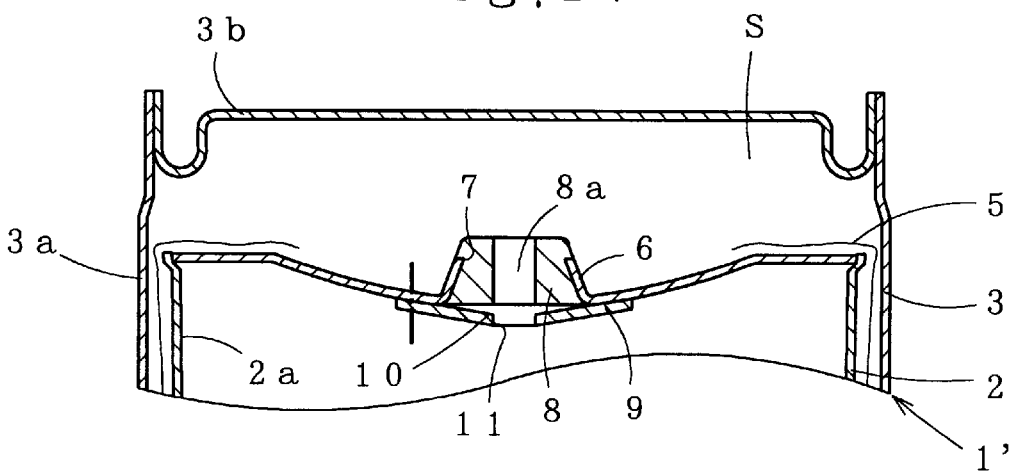
FIG. 17 is a fragmentary sectional view showing another modified form of the vacuum bottle to be fabricated according to the sealing method of the present invention.

In the sealing methods described above, brazing material placing recess 6 is formed in such a way that the double-shell container 1' is sealed in upright condition, but as shown in FIG. 15, it may be formed in such a way that the double-shall container 1' is sealed in upside-down condition. Further, as FIGS. 16 and 17, the brazing-material placing recess 6 may be formed on the bottom plate 2b side of the inner shell 2. Also, the brazing-material placing recess 6 may be formed on the shell 2a, 3a side. That is, the brazing-material placing recess 6 may be formed so as to be open downward at the stage of sealing, with the drop preventing member 9 placed under the recess, whereby the same effect and advantage as mentioned above can be obtained.

Further, vacuum structures which can be fabricated according to the above described method are not limited to vacuum bottle 1, but may be applied to vacuum double-pipes, insulating vacuum panels, vacuum vessels, and the like as well.

As may be apparent from the foregoing description, in the sealing method for vacuum structure of the invention, the molten brazing material is placed by melt deposition in the brazing-material placing recess having the aperture formed therein, with the evacuation port formed in the brazing material, and the drop preventing member is disposed outside the brazing material. Therefore, in the process of sealing, the molten brazing material is gravitationally lowered, so that the molten brazing material can be prevented by the drop preventing member from dropping outward. As a result, the evacuation port formed in the brazing material by the deposition of the molten brazing material per se is caused to disappear and closed. Therefore, the brazing material can be securely placed prior to sealing. As gases and flux and the like evolving at the stage of depositing the brazing material are discharged from the aperture of the brazed-material placing recess. Therefore, there is no possibility of occurrence of defects, such as voids, on the deposition surface between the brazing material and the opening of the brazing-material placing recess. As a result, the occurrence of unsatisfactory sealing can be substantially reduced and production stability with respect to the fabrication of vacuum structure. Further, at the sealing stage, even if the structure is slightly inclined from the predetermined position, dropping of the molten brazing material can be prevented by the drop preventing member. Therefore, high precision is not required in connection with the designing of production line.

Furthermore, where the diameter of the evacuation port formed in the brazing material is not less than 3 mm, it is possible to reduce the working time for vacuum-evacuating the space. Furthermore, since gases evolving in connection with brazing material melting can be surely discharged, the load applied to the getter for adsorbing gases evolving within the space is reduced, it being thus possible to improve the precision of vacuum of the vacuum bottle per se. The evacuation port can be caused to surely disappear and become closed merely by applying an external force due to vibration to the component members.

We claim:

1. A method of sealing a metal vacuum structure for evacuating a space closed by component members through an evacuation port and then sealing the evacuation port, the method comprising:

forming a brazing-material placing recess in one of the component members, the brazing-material placing recess opening downward when the structure is set for evacuation;

forming an aperture in the brazing-material placing recess;

placing brazing material, in molten state, in the brazing-material placing recess in such a way as to block the aperture and fixing the brazing material;

forming an evacuation port in the brazing material;

fixing a drop preventing member having a through hole on the component member in opposed relation to the brazing material;

evacuating the space closed by the component members through the evacuation port of the brazing material;

melting the brazing material; and making the evacuation port disappear to seal it by melting the brazing material as the drop preventing member prevents the brazing material from dropping.

2. A method of sealing a metal vacuum structure as set forth in claim 1, wherein the diameter of the aperture is not less than 3 mm.

3. A method of sealing a metal vacuum structure as set forth in claim 1, wherein the brazing material is placed, in molten state, in the brazing-material placing recess in which flux is carted.

4. A method of sealing a metal vacuum structure as set forth in claim 1, wherein the drop preventing member is formed with a recess open upward and opposed to the evacuation port.

5. A method of sealing a metal vacuum structure as set forth in claim 1, wherein the through hole of the drop preventing member is opposed to the evacuation port and has a diameter of not more than 2 mm.

6. A method of sealing a metal vacuum structure as set forth in claim 1, wherein the drop preventing member is comprised of a mesh-like wire sheet.

7. A method of sealing a metal vacuum structure as set forth in claim 1, wherein the evacuation port in the brazing material is smaller in diameter than the aperture but not less than 3 mm, and wherein the evacuation port of the brazing material can be made to disappear by application of an external force during the step of melting the brazing material.

8. A method of sealing a metal vacuum structure as set forth in claim 1, wherein the drop preventing member is fixed to the component member by spot welding.

* * * * *